(12) United States Patent
Ishii et al.

(10) Patent No.: US 6,987,074 B2
(45) Date of Patent: Jan. 17, 2006

(54) PAINTWORK COATING COMPOSITION AND COATING CLOTH

(75) Inventors: Makoto Ishii, Osaka (JP); Junichi Nonaka, Osaka (JP); Ryutaro Hidaka, Osaka (JP)

(73) Assignee: Soft99 Corporation, Osaka (JP)

( * ) Notice: Subject to any disclaimer, the term of this patent is extended or adjusted under 35 U.S.C. 154(b) by 181 days.

(21) Appl. No.: 10/305,963

(22) Filed: Nov. 29, 2002

(65) Prior Publication Data

US 2003/0114058 A1 Jun. 19, 2003

Related U.S. Application Data

(62) Division of application No. 09/837,232, filed on Apr. 19, 2001, now Pat. No. 6,653,393.

(30) Foreign Application Priority Data

Oct. 19, 2000 (JP) .............................. 2000-319680
Dec. 6, 2000 (JP) .............................. 2000-371596

(51) Int. Cl.
*B32B 27/12* (2006.01)
(52) U.S. Cl. .................. 442/59; 442/94; 442/98; 510/400; 510/109; 510/189
(58) Field of Classification Search .................. 442/59; 510/109, 189, 400
See application file for complete search history.

(56) References Cited

U.S. PATENT DOCUMENTS

| | | | | |
|---|---|---|---|---|
| 4,963,432 A | * | 10/1990 | Fuggini et al. | ............. 442/165 |
| 5,242,887 A | | 9/1993 | Usui | |
| 5,397,831 A | | 3/1995 | Saito et al. | |
| 5,612,043 A | * | 3/1997 | Deprez et al. | ............. 424/401 |
| 5,753,607 A | * | 5/1998 | Burke et al. | ................ 510/242 |
| 5,922,787 A | | 7/1999 | Kondo et al. | |
| 6,100,325 A | | 8/2000 | Chittofrati et al. | |
| 6,210,690 B1 | * | 4/2001 | Nabeshima et al. | ........ 424/401 |
| 6,228,937 B1 | | 5/2001 | Eck et al. | |
| 6,258,758 B1 | | 7/2001 | Greer | |
| 6,325,752 B1 | | 12/2001 | Tomihashi et al. | |
| 6,723,349 B1 | * | 4/2004 | Hill et al. | ................... 424/604 |

FOREIGN PATENT DOCUMENTS

| | | |
|---|---|---|
| EP | 0 818 489 A2 | 1/1998 |
| EP | 0 894 838 A2 | 2/1999 |
| EP | 0 894 839 A2 | 2/1999 |
| EP | 0 969 027 A1 | 1/2000 |
| JP | 05-130963 | 5/1993 |
| JP | 06-13663 | 2/1994 |
| JP | 09-235506 | 9/1997 |
| JP | 11-000295 | 1/1999 |

OTHER PUBLICATIONS

EPO search report dated May 30, 2003.
Office Action from the Shanghai Patent & Trademark Office; mailed Dec. 10, 2004; re. application 01116957.5; (with English translation).

* cited by examiner

Primary Examiner—Cheryl A. Juska
Assistant Examiner—Arden B. Sperty
(74) Attorney, Agent, or Firm—Kilpatrick Stockton LLP

(57) ABSTRACT

To provide a paintwork coating composition that is harmless to the environments and humans and enables a paintwork to be fully coated by the application of only a small quantity of coating composition and also provide a coating cloth that provides a smooth rubbing work in the coating process and can develop a good water-repellent property and a good antifouling property, water dispersion comprising polytetrafluoroethylene and perfluoropolyether is prepared as the coating composition, and also the coating composition is impregnated in a cloth having a basis weight of (unit representing mass per unit area of fabric, a gram number per square meter) 30–300 $g/m^2$ and a density of 0.02–0.3 $g/cm^3$ under load condition of 1.961 KPa.

1 Claim, No Drawings

PAINTWORK COATING COMPOSITION AND COATING CLOTH

CROSS-REFERENCE TO RELATED APPLICATIONS

This application is a divisional application of U.S. patent application Ser. No. 09/837,232, filed on Apr. 19, 2001, now U.S. Pat. No. 6,653,393, and claims priority to Japanese patent application Ser. No. 2000-319680, filed Oct. 19, 2000, and Japanese patent application Ser. No. 2000-371596, filed Dec. 6, 2000, all of which are incorporated herein by reference.

BACKGROUND OF THE INVENTION

1. Field of the Invention

The present invention relates to a paintwork coating composition and to a coating cloth and, more particularly, to a paintwork coating composition to coat a paintwork in a vehicle and the like and to a coating cloth.

2. Description of Background Art

Car waxes have been widely used for coating a paintwork in a vehicle. Usually, the car wax comprises a mixture of a wax component to protect and polish a paintwork in a vehicle and a silicone oil to provide a water-repellent property to the paintwork. A variety of car waxes having various properties are known, including cake, paste-form wax and liquid-form wax.

Some car waxes use a wax component that is subjected to fouling, depending on its composition and content. For improvement in antifouling of a paintwork, for example, Japanese Patent Publication No. Hei 6(1994)-13,663 proposed a coating treatment comprising 1–50 weight % of low molecular weight polytetrafluoroethylene having a molecular weight of 1,000 to 100,000 and 0.1–25 weight % of perfluoropolyether.

Fluorochemical wax is superior to silicon wax in antifouling property of the coated paintwork. In view of this, for example, Japanese Laid-open (Unexamined) Patent Publication No. Hei 5(1993)-130,963 proposed a car wax-applying wet sheet comprising a non-woven fabric sheet wetted by a fluorochemical wax.

Meanwhile, in recent years, the so-called dry bright type of car waxes requiring no wiping of wax after applied to the paintwork are becoming widely used. Since the dry bright type of car wax requires no wiping of wax, it has the advantage that the waxing can be done in a simple work and in a short time.

The coating treatment disclosed by Japanese Patent Publication No. Hei 6(1994)-13,663 cited above uses an organic solvent, such as naphtha for industrial use, as dispersion solvent of polytetrafluoroethylene and perfluoropolyether, as referred to in the examples, and as such is not really desirable for the environments and the humans.

With this coating treatment, when the wax is applied to the paintwork, the quantity of adherence of wax to the paintwork per quantity of wax applied thereto is small. Accordingly, a large quantity of wax is practically required for the application of the wax to the paintwork and, after the waxing, the wiping of the wax is required. Consequently, it is difficult to apply this coating treatment to the dry bright type of wax requiring a small quantity of wax and requiring no wiping of the wax.

Further, the fluorochemical wax has a good antifouling property of the coating of paintwork, but even the fluorochemical wax having the same components may fail to form a good coating on the paintwork, depending upon the type of cloth used, so that the water-repellent property and the antifouling property may reduce.

In the dry bright type wax, in particular, the cloth used reflects on the waxing performance significantly, because a small quantity of wax is applied to the paintwork and also there is a need to eliminate the wiping of the wax after the application of wax.

It is an object of the invention to provide a paintwork coating composition that is harmless to the environments and humans and enables the paintwork to be fully coated by the application of only a small quantity of coating composition. It is another object of the invention to provide a coating cloth that provides a smooth rubbing work in the coating process and can develop a good water-repellent property and a good antifouling property.

SUMMARY OF THE INVENTION

The present invention provides a novel paintwork coating composition comprising water dispersion comprising polytetrafluoroethylene and perfluoropolyether.

According to the paintwork coating composition of the present invention, the quantity of adherence of the coating composition to the paintwork per quantity of coating composition applied thereto is large. Therefore, the coating composition of the present invention can suitably be used as the coating composition of the dry bright type requiring no wipe after a small quantity of coating composition is rubbed thereon. Further, since the paintwork coating composition of the present invention is water dispersion, good working conditions harmless to environments and humans can be ensured. Thus, the coating composition of the present invention is harmless to the environments and humans and also can be effectively used as the non-wipe coating composition for simplifying the coating work and finishing it in a short time.

In the paintwork coating composition of the present invention, it is preferable that the water dispersion of polytetrafluoroethylene and the water dispersion of perfluoropolyether are mixed.

In the paintwork coating composition of the present invention, it is preferable that the content of polytetrafluoroethylene is not more than 0.8 weight % per total quantity of paintwork coating composition.

In the paint coating composition of the present invention, it is preferable that a hydrophilic organic modified silicone oil is further mixed. It is preferable that the hydrophilic organic modified silicone oil is polyether modified silicone oil.

In the paintwork coating composition of the present invention, it is preferable that ion cross-linked organic acids is further mixed as a thickening agent.

The present invention provides a novel coating cloth wherein a coating composition comprising polytetrafluoroethylene and perfluoropolyether is impregnated in a cloth having a basis weight of 30–300 g/m$^2$ and a density of 0.02–0.3 g/cm$^3$ under load condition of 1.961 KPa.

According to the coating cloth of the present invention, the smooth rubbing work in the coating process can be ensured and also the coating having little unevenness can be formed on the paintwork, so that the good water-repellent property and the good antifouling property are developed. Particularly, when the coating composition is impregnated in the cloth in the form of water dispersion, polytetrafluoroethylene and perfluoropolyether are stably dispersed in water before the rubbing of the coating composition, while, once the coating composition is rubbed over the paintwork, they are allowed to adequately adhere to the paintwork by the rubbing force and are hardly reverted into water. Consequently, the quantity of adherence of the coating composition to the paintwork per quantity of coating composition applied thereto is large. Therefore, the coating cloth of the present invention can suitably be used as the coating cloth of the dry bright type requiring no wipe after a small quantity of coating composition is rubbed thereon. Further, the cloth impregnated with the coating composition can dispense with the organic solvent, so good working conditions for environments and humans can be ensured.

In the coating cloth of the present invention, it is preferable that the coating composition is water dispersion comprising polytetrafluoroethylene and perfluoropolyether. Also, it is preferable that the content of polytetrafluoroethylene in the coating composition is not more than 0.8 weight %.

In the coating cloth of the present invention, it is preferable that a hydrophilic organic modified silicone oil, or polyether modified silicone oil, in particular, is further mixed in the coating composition. Also, it is preferable that ion cross-linked organic acids is further mixed in the coating composition as a thickening agent.

DETAILED DESCRIPTION OF PREFERRED EMBODIMENTS

A paintwork coating composition of the present invention (hereinafter it is simply referred to as "the coating composition", which is equivalent to "the paintwork coating composition", unless otherwise specified.) comprises water dispersion comprising polytetrafluoroethylene and perfluoropolyether.

Polytetrafluoroethylene (hereinafter it is sometimes abbreviated to PTFE) can be produced, for example, by polymerizing tetraethylene fluoride in a known manner. Polytetrafluoroethylene having a number average molecular weight of 1,000 to 1,000,000 or preferably of 3,000 to 500,000 is preferably used. Polytetrafluoroethylenes that may be used include commercially available products, such as Lubron L Series (available from Daikin Industries, Ltd., PTFE powder), Fluon L Series (available from Asahi I.C.I. Fluoropolymers Co., Ltd., PTFE powder), Fluon CD Series (available from Asahi Glass Co., Ltd., PTFE powder), Hostaflon Series (available from Dyneon, PTFE powder), Teflon TFE (available from Du Pont-Mitsui Fluorochemicals Co., Ltd., PTFE powder), KTL, KT Series (available from Kitamura Ltd., PTFE powder), Cefral lube (available from Central Glass Co., Ltd., PTFE powder) and Algoflon (available from Ausimont K.K., PTFE powder).

Perfluoropolyethers that may be used include polymers and their derivatives having the structure of the following formulas (1) to (4), which can be produced by a known method, such as by ring-opening addition polymerization of perfluoroalkylene oxide or by irradiation of perfluoroalkenes with ultraviolet.

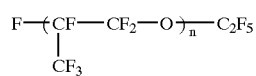 (Formula 1)

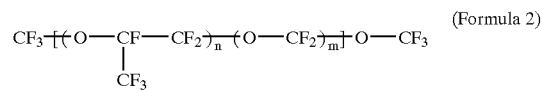 (Formula 2)

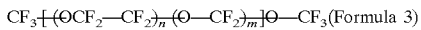(Formula 3)

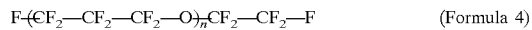 (Formula 4)

(In the formulas (1)–(4) given above, m represents an integer of 1–300 and n represents an integer of 1–210)

Perfluoropolyether having a number average molecular weight of 400 to 20,000 or preferably of 1,000 to 15,000 is preferably used. Commercially available products may be used as the perfluoropolyether. For example, KRYTOX Series (available from Du Pont de Numours & Co.) can be cited as equivalent of the one having the structural formula (1); FOMBLIN Series, Y-type (available from Ausimont K.K.) can be cited as equivalent of the one having the structural formula (2); FOMBLIN Series, M-type and Z-type (available from Ausimont K.K.) can be cited as equivalent of the one having the structural formula (3); and DEMNUM Series (available from Daikin Industries, Ltd.) can be cited as equivalent of the one having the structural formula (4).

The coating composition of the present invention can be produced by dispersing polytetrafluoroethylene and perfluoropolyether in water. The dispersion of polytetrafluoroethylene and perfluoropolyether in water can be obtained, for example, by mixing and agitating polytetrafluoroethylene, perfluoropolyether and a dispersing agent and then adding water to the mixture, to forcibly disperse them in water.

Dispersing agents that may be used include, for example, (i) anionic surface active agents typified by Na, K, Li, ammonia, morpholine and alkanolamine salt, such as higher fatty acid salt including oleic acid, alkylbenzene sulfonate, alkyl sulfate, polyoxyalkyl sulfate and alkan sulfonate, (ii) nonionic surface active agents typified by polyoxyethylene derivatives, such as polyoxyethylene alkyl ether, polyoxyethylene alkyl aryl ether, sorbitan fatty acid ester, polyoxyethylene sorbitan fatty acid ester, polyhydric alcohol fatty acid ester, polyoxyethylene alkylamine, polyoxyethylene fatty acid ester, oxyethylene oxypropylene block polymer, fatty acid alkanolamide, amine oxide and others, (iii) cationic surface active agents typified by alkylamine salt and quaternary ammonium salt, etc., (iv) amphoteric ionic surface active agents typified by e.g. alkylbetaine, and (v) polyacrylic acid salt typified by e.g. polyacrylic acid ammonium. In addition, commonly used surface active agents, such as fluorochemical surface active agent and silicon surface active agent, having the emulsification property and the solubilization and dispersion property may be used. For example, polyacrylic acid salt is preferably used, though it depends upon its intended purposes and applications.

For example, 0.01–0.8 weight %, or preferably 0.05–0.5 weight %, of polytetrafluoroethylene, 0.01–5.0 weight %, or preferably 0.1–2.0 weight %, of perfluoropolyether, and 0.01–10.0 weight %, or preferably 0.1–5.0 weight %, of dispersing agent are mixed per the total quantity of water dispersion and, then, the mixture is added into water and agitated to be forcibly dispersed in water. The quantity used can be reduced by using the fluorochemical surface active agent.

The water dispersion thus obtained takes the state in which polytetrafluoroethylene and perfluoropolyether are dispersed in water in an emulsified form or in a suspended form. When the water dispersion takes the state in which they are dispersed in water in the emulsified form, a stable oil-in-water (O/W) emulsion is formed in which polytetrafluoroethylene and perfluoropolyether exist in micelle. When the water dispersion takes the state in which they are dispersed in water in the suspended form, a stable suspension is formed in which polytetrafluoroethylene and perfluoropolyether are dispersed in a block form or in an oil spot form.

While the coating composition of the present invention may be produced by forcibly dispersing polytetrafluoroethylene and perfluoropolyether in water, it is further preferable that the water dispersion comprising polytetrafluoroethylene and perfluoropolyether is produced by mixing the water dispersion of polytetrafluoroethylene as was prepared in advance and the water dispersion of perfluoropolyether as was prepared in advance.

The mixing of the water dispersion of polytetrafluoroethylene and the water dispersion of perfluoropolyether takes the state in which polytetrafluoroethylene and perfluoropolyether are separately dispersed in water in the emulsified form or in the suspended form. When the water dispersion takes the state in which they are dispersed in water in the emulsified form, a stable mixed solution of oil-in-water (O/W) emulsion is formed in which polytetrafluoroethylene and perfluoropolyether separately exist in micelle. When the water dispersion takes the state in which they are dispersed in water in the suspended form, a stable mixed solution of suspension is formed in which polytetrafluoroethylene and perfluoropolyether are separately dispersed in a block form or in an oil spot form.

The coating composition of the present invention comprising the mixture of the water dispersion of polytetrafluoroethylene and the water dispersion of perfluoropolyether has the characteristic feature that polytetrafluoroethylene and perfluoropolyether are kept in the state of being separately and stably dispersed in water, before the rubbing of the coating composition, while, at the time of the rubbing of the coating composition, they are mixed with each other while being adhesively rubbed on the paintwork by the rubbing force. Consequently, a smooth rubbing work in the coating process can be ensured and also a good coating of even in coating thickness can be obtained, as compared with the coating composition comprising polytetrafluoroethylene and perfluoropolyether which are forcibly dispersed from the beginning.

The water dispersion of polytetrafluoroethylene can be obtained as the water dispersion of polytetrafluoroethylene as it is by a known process such as a solution polymerization process or an emulsion polymerization process.

The water dispersions of polytetrafluoroethylene that may be used include commercially available products, such as KRYTOX DF/W (available from Du Pont de Numours & Co., PTFE emulsion with a solid content of 20 weight % and a number average molecular weight of 3,500), KRYTOX LW-1,200 (available from Du Pont de Numours & Co., PTFE emulsion with a solid content of 20 weight % and a number average molecular weight of 40,000), Fluon AD Series (available from Asahi I.C.I. Fluoropolymers Co., Ltd., PTFE dispersion), Hostaflon 5,000 Series (available from Dyneon, PTFE dispersion), and Lubron LDW-40 (available from Daikin Industries, Ltd., PTFE dispersion).

The water dispersion of perfluoropolyether can also be obtained, for example, by the emulsion polymerization process or the forcible dispersion process, as is the case with the process above. The water dispersion of perfluoropolyether that may be used include commercially available products. Of the commercially available products cited above, L-205 (available from Chukyo Yushi K.K., perfluoropolyether emulsion, a nonvolatile content of 64 weight %), K-926 (available from Chukyo Yushi K.K., perfluoropolyether emulsion, a nonvolatile content of 64 weight %), L-287 (available from Chukyo Yushi K.K., perfluoropolyether emulsion, a nonvolatile content of 64 weight %), NIKKOL NET-HC Series (available from Nikko Chemicals Co., Ltd., perfluoropolyether emulsion), NIKKOL NET-U Series (available from Nikko Chemicals Co., Ltd., perfluoropolyether emulsion), and FOMBLIN Emulsion FE-20 Series (available from Ausimont K.K., perfluoropolyether emulsion) can be cited, for example.

The coating composition of the present invention thus obtained is preferably prepared so that polytetrafluoroethylene of a solid content of not more than 0.8 weight %, or preferably not more than 0.5 weight %, or particularly 0.05–0.5 weight % can be contained in the water dispersion comprising polytetrafluoroethylene and perfluoropolyether (or in the total quantity of coating composition when various components are mixed therein, as will be mentioned later). With not more than 0.8 weight % of polytetrafluoroethylene, the coating composition can be effectively applied to the dry bright type of car wax requiring only a small quantity of wax to be rubbed on the paintwork and no wiping, as mentioned later.

In addition, the coating composition of the present invention is preferably prepared so that 0.01–5.0 weight %, or preferably 0.1–2.0 weight %, of perfluoropolyether is contained in the water dispersion comprising polytetrafluoroethylene and perfluoropolyether (or in the total quantity of coating composition when various components are mixed therein, as will be mentioned later). With not more than 0.01 weight % of perfluoropolyether, there is the possibility that sufficient polishing and water-repellent and oil-repellent properties may not be obtained. With not less than 5.0 weight % of perfluoropolyether, there is the possibility that the oil may remain excessively on the paintwork, which may cause unevenness in coating thickness.

In the coating composition of the present invention, organic modified silicone oil may further be mixed. Organic modified silicone oils that may be used include, for example, (i) hydrophobic organic modified silicone oils, such as dimethyl silicone oil, methylphenyl silicone oil, methylhydrodiene silicone oil, alkyl modified silicone oil, alkylaralkyl modified silicone oil, fluorine modified silicone oil, epoxy modified silicone oil, epoxypolyether modified silicone oil, phenol modified silicone oil and acryl modified silicone oil, (ii) hydrophilic organic modified silicone oil, such as polyether modified silicone oil, alcohol modified silicone oil, amino modified silicone oil, carboxyl modified silicone oil and mercapto modified silicone oil, and (iii) other modified silicone oils into which various organic functional groups are introduced. The organic modified silicone oils may be used singularly or in combination of two or more. It is to be noted that the hydrophobic organic modified silicone oils and the hydrophilic organic modified silicone oil cited above are classified under common methods of classification. To be more specific, the belonging to the hydrophobic organic modified silicone oils or the hydrophilic organic modified silicone oil is determined properly under a ratio of modification of hydrophilic group and hydrophobic group.

Of these, the hydrophilic organic modified silicone oil is preferably used in the coating composition of the present invention. More specifically, nonionic organic modified silicone oil, such as polyether modified silicone oil, and ionic organic modified silicone oil, such as amino modified silicone oil and carboxyl modified silicone oil, are preferably used in the coating composition of the present invention. When hydrophilic organic modified silicone oil is mixed in the coating composition, the smooth rubbing work in the coating process can be ensured and also the good coating of even in coating thickness can be obtained. Particularly when the polyether modified silicone oil is mixed in the coating composition, that effect is significantly developed.

Polyether modified silicone oils that may be used include, for example, (i) silicone oils with modified polyether in which polysiloxane is modified with polyoxyalkylene, such as dimethylsiloxane.methyl (polyoxyethylene) siloxane copolymer, dimethylsiloxane.methyl (polyoxyethylene.polyoxypropylene) siloxane copolymer, and polyoxyethylene.methylpolysiloxane copolymer, and (ii) fluorine.polyether modified silicone oils modified by alkyl fluoride. For example, those having HLB (hydrophile-lipophile balance) of about 10 are preferably used.

Polyether modified silicone oils that may be used include commercially available products, such as KF-353, KF-618, KF-354 and KF-355 (available from Shin-Etsu Chemical Co., Ltd., polyether modified silicone), FPD Series (Shin-Etsu Chemical Co., Ltd., fluorine.polyether modified silicone), SH3746, SH3749, SH8400 and SH8410 (available from Dow Corning Toray Silicone Co., Ltd., polyether modified silicone), and L03 and L051 (Wacker Asahikasei Silicone Co., Ltd., polyether modified silicone).

The coating composition of the present invention is preferably prepared so that 0.01–3.0 weight %, or preferably 0.01–0.5 weight %, of organic modified silicone oil is contained in the total quantity of coating composition. With not more than 0.01 weight % of organic modified silicone oil, there is the possibility that at the time of rubbing of the wax, unevenness in coating thickness may be caused to hinder the smooth rubbing treatment. With not less than 3.0 weight % of organic modified silicone oil, the evenness in coating thickness can be provided, but the initial water-repellent and oil-repellent properties and the persistence may reduce.

In the coating composition of the present invention, wax, resin and thickening agent may preferably be mixed for the intended purposes and applications.

The waxes that may be used include, for example, (i) natural waxes typified by carnauba wax, candelilla wax, montan wax, ceresin, paraffin, microcrystalline wax and ozokerite, (ii) acid waxes and ester waxes and derivatives thereof based on α-olefin wax, Fischer-Tropsch wax and derivatives thereof, polyolefin wax and derivatives thereof, paraffin oxide, microcrystalling wax oxide, castor wax and montan wax, (iii) wax-like material typified by lanolin derivatives, petroleum olefin-based olefin and maleic acid anhydride or acrylic acid, waxes comprising vinyl acetate, metal soap, fat and oil, higher fatty acid, higher alcohol, hydrogenated oil, aliphatic acid amide and polyether, and (iv) a variety of modified waxes such as fluorine modified wax, silicone modified wax and resin modified wax. The wax mixed can provide improved coating or polishing of the paintwork. The wax is preferably used in the form of the water dispersion of the emulsion form or suspension form. The coating composition of the present invention is preferably prepared so that 0.01–5.0 weight %, or preferably 0.02–3.0 weight %, of wax is contained in the total quantity of coating composition.

The resins that may be used include, for example, silicone resin, fluorochemical resin, petroleum resin, terpene resin, alicyclic hydrocarbon resin, alkyd resin, polyamide resin, polyurethane resin, phenol resin, urea melamine resin, polyester resin, amino resin, melamine resin, acrylic resin, vinyl resin, urea resin, epoxy resin, rosin modified resin, amino alkyd resin, modified alkyd resin, natural resin, ketone resin and rosin resin. The resin may be used singularly or in combination of two or more. The resin mixed can provide improved grab. The resin is preferably used in the form of the water dispersion of the emulsion form or suspension form. The coating composition of the present invention is preferably prepared so that 0.01–3.0 weight %, or preferably 0.02–1.0 weight %, of resin is contained in the total quantity of coating composition.

The thickening agents that may be used include, for example, ion cross-linked organic acids, gums, minerals and celluloses. In addition to these, they also include agar, gelatin and polyacrylamide.

Examples of the ion cross-linked organic acids are organic acids, such as polyacrylic acid and alginic acid, in which ions are cross-linked by addition of salt, so that molecular chains are extended to develop the thickening property. For the polyacrylic acid, the salts added include, for example, inorganic alkalis, such as sodium hydroxide, potassium hydroxide, sodium carbonate, sodium hydrogen carbonate and ammonia, and alkalis including organic amines, such as monoethanolamine, diethanolamine, triethanolamine, triethylamine, di-isopropanolamine, di-(2-ethylhexyl)amine, aminomethylpropanol, tromethamine and tetrahydroxypropylethylene diamine. For the alginic acid, the salts added include, for example, divalent metallic salts, such as calcium chloride and magnesium chloride. These salts are used in equivalence required to neutralize the carboxylic acid of the organic acid.

The gums that may be used include, for example, gum arabic, Cyamoposis Gum and derivatives thereof, vee gum, xanthan gum, Welan gum, ramthan gum and gelan gum. The minerals that may be used include, for example, bentonite and montmorillonite. The celluloses that may be used include, for example, carboxymethyl cellulose, hydroxyethyl cellulose and hydroxypropyl cellulose. The thickening agents may be used singularly or in combination of two or more. The mixture of the thickening agent can provide improved control of sediment of component and improved solution stability.

Of these, the ion cross-linked organic acids are preferably used in the coating composition of the present invention. The mixture of the ion cross-linked organic acids can develop water retention characteristics to improve workability, so that a good coating having even thickness can be realized.

The thickening agent is preferably adjusted so that when thickening agent is contained in the coating composition, the coating composition can have the viscosity of 0.05–200 Pa·s, or preferably 0.1–80 Pa·s.

Further, a variety of usually added additives, such as polishing agent, surface active agent, abrasive, dye, pigment, perfume agent, lubricant, ultraviolet absorption agent and oxidation inhibitor may be mixed in the coating composition of the present invention. For example, the mixture of lubricant, such as silicone powder and wax powder, can provide an improved wiping property.

In the coating composition of the present invention, the components cited above are mixed in water in the proportion mentioned above and agitated to be uniformly dispersed in water to thereby produce the water dispersion. It is to be noted that when the thickening agent is added, it can be mixed in the initial stage or last stage or in any selective stage of mixing the respective components, to thicken the coating composition of the present invention uniformly for improvement of viscosity thereof.

The coating composition of the present invention thus produced can be applied to the coating of paintworks in metals, plastics, ceramics and woods, without limiting to any specific paintwork. To be more specific, the coating composition of the present invention can be applied to the coating of paintworks in vehicles, aircrafts, boats and ships, heavy machinery, machines in various industries, furniture, electrical household appliances and electrical equipment, and a variety of household appliances.

When the paintwork is treated by use of the coating composition of the present invention, e.g. about 5–50 g, or preferably about 15–40 g, per square meter of coating composition can be used and rubbed over the paintwork with a cloth until the paintwork is cleaned up.

According to the coating composition of the present invention, polytetrafluoroethylene and perfluoropolyether are stably dispersed in water before the rubbing of the coating composition, while, once the coating composition is rubbed over the paintwork, they are allowed to adequately adhere to the paintwork by the rubbing force and are hardly reverted into water. Consequently, the quantity of adherence of the coating composition to the paintwork per quantity of coating composition applied thereto is large. Therefore, the coating composition of the present invention can suitably be used as the coating composition of the dry bright type requiring no wipe after a small quantity of coating composition is rubbed thereon.

Further, according to the coating composition of the present invention, water is used, instead of organic solvent, as the dispersion solvent of polytetrafluoroethylene and perfluoropolyether. Due to this, the coating composition is desirable for the environments and the humans, and good working conditions are ensured.

Thus, the coating composition of the present invention is harmless to the environments and humans and also can be effectively used as the non-wipe wax for simplifying the waxing work and finishing it in a short time.

In addition, the coating cloth of the present invention is formed by a cloth having a basis weight (unit representing mass per unit area of fabric, a gram number per square meter) of 30–300 g/m$^2$ and a density of 0.02–0.3 g/cm$^3$ under load condition of 1.961 KPa being impregnated with coating composition comprising polytetrafluoroethylene and perfluoropolyether (the coating composition defined herein is not limited to the coating composition above, as long as it comprises polytetrafluoroethylene and perfluoropolyether) or preferably with the same coating composition as above.

The cloth used in the present invention is a cloth having a basis weight of 30–300 g/m$^2$, or preferably 40–200 g/m$^2$, and a density of 0.02–0.3 g/cm$^3$, or preferably 0.1–0.25 g/cm$^3$, under load condition of 1.961 KPa.

With the cloth having a basis weight smaller than that, the thickness of the cloth is reduced excessively and thus the retention volume of the coating composition impregnated is reduced, so that the coating composition cannot be fully impregnated in the cloth. As a result of this, such a cloth cannot wax the paintwork to a sufficient extent. On the other hand, with the cloth having a basis weight larger than that, the thickness of the cloth is increased excessively and thus the processing of the cloth and the workability in the waxing treatment are lowered.

Also, with the density smaller than that under load condition of 1.961 KPa, the retention of impregnated coating composition in the cloth is reduced and the retention volume is also reduced, accordingly. As a result of this, such a cloth cannot wax the paintwork to a sufficient extent. Additionally, in the waxing work, the quantity of coating composition discharged from the cloth impregnated with the coating composition is increased and, as a result, surplus components adhere to the paintwork and thus the coating having even thickness cannot be formed on the paintwork. With the density of larger than that, the retention volume is reduced and thus the quantity of coating composition discharged from the cloth impregnated with the coating composition is reduced and, as a result, a sufficient quantity of components do not adhere to the paintwork.

The cloth can be used without any particular limitation, as long as it has a basis weight and a density in the range specified above. Preferably, the non-woven fabric is used. The non-woven fabrics that may be used include, for example, wet non-woven fabric, dry pulp non-woven fabric, dry non-woven fabric, spun-bonded non-woven fabric, melt-blow non-woven fabric and flash spun non-woven fabric.

To be more specific, the non-woven fabrics that may be used include, for example, 100% polyester, dry, needle-punched, non-woven fabric (basis weight of 110 g/m$^2$ and density of 0.07 g/cm$^3$ under load condition of 1.961 KPa), 100% rayon, dry, spun-lace non-woven fabric (basis weight of 40 g/m$^2$ and density of 0.18 g/cm$^3$ under load condition of 1.961 KPa), 100% nylon, melt-blow non-woven fabric (basis weight of 50 g/m$^2$ and density of 0.15 g/cm$^3$ under load condition of 1.961 KPa), 70% acryl and 30% polyester blended, wet, spun-lace, non-woven fabric (basis weight of 40 g/m$^2$ and density of 0.15 g/cm$^3$ under load condition of 1.961 KPa), 50% polypropylene and 50% polyester blended, dry, thermal-bonded, non-woven fabric (basis weight of 40 g/m$^2$ and density of 0.12 g/cm$^3$ under load condition of 1.961 KPa), 25% nylon, 25% polyethylene and 50% rayon blended, dry, chemical-bonded, non-woven fabric (basis weight of 40 g/m$^2$ and density of 0.12 g/cm$^3$ under load condition of 1.961 KPa) and 25% nylon, 25% polyethylene and 25% polyester and 25% rayon blended, dry, spun-lace, non-woven fabric (basis weight of 85 g/m$^2$ and density of 0.17 g/cm$^3$ under load condition of 1.961 KPa).

The methods of impregnating the cloth with the coating composition that may be used include, for example, a dip roll coater, a rotogravure roll coater, a spray coater, a reverse roll coater, a direct roll coater, a kiss roll coater, an inverse knife coater, an air knife coater, an opposite knife coater and a brush application. The coating cloth of the present invention can be produced by impregnating the coating composition in the fabric in any of those known methods. The coating composition is often made to shower over the fabric from above, the method of which is called a showering method.

The coating composition is impregnated in the cloth in the proportion of the coating composition being 1.0 to 5.0 times, or preferably 1.5 to 4.0 times, the cloth in weight.

The coating cloth of the present invention thus produced can be applied to the coating of paintworks in metals, plastics, ceramics and woods, without limiting to any specific paintwork. To be more specific, the coating cloth of the present invention can be applied to the coating of paintworks in vehicles, aircrafts, boats and ships, heavy machinery, machines in various industries, furniture, electrical household appliances and electrical equipment, and a variety of household appliances.

When the paintwork is treated by use of the coating cloth of the present invention, the paintwork is rubbed with the coating cloth of the invention until the paintwork is cleaned up so that the paintwork can be coated with the coating composition.

With the coating cloth of the present invention, the smooth rubbing work in the coating process can be ensured and also the good coating of even in coating thickness can be formed on the paintwork and thus the good water-repellent property and the good antifouling property can be developed. Particularly, when the coating composition is impregnated in the cloth in the form of water dispersion, polytetrafluoroethylene and perfluoropolyether are stably dispersed in water before the rubbing of the coating composition, while, once the coating composition is rubbed over the paintwork, they are allowed to adequately adhere to the paintwork by the rubbing force and are hardly reverted into water. Consequently, the quantity of adherence of the coating composition to the paintwork per quantity of coating composition applied thereto is large. Therefore, the coating cloth of the present invention can suitably be used as the coating cloth of the dry bright type requiring no wipe after a small quantity of coating composition is rubbed thereon. Further, the cloth impregnated with the coating composition in the form of water dispersion can dispense with the organic solvent, so good working conditions for environments and humans can be ensured.

EXAMPLES

In the following, the present invention will be described in further detail with reference to Examples and Comparative Examples. The present invention is not in any manner limited to these Examples and Comparative Examples, however.

Example 1

KRYTOX DF/W (available from Du Pont de Numours & Co., PTFE emulsion, a solid content of 20 weight %, and a number average molecular weight of 3,500): 2.0 weight %

L-205 (available from Chukyo Yushi K.K., perfluoropolyether emulsion, a nonvolatile content of 64 weight %): 2.0 weight % ion exchange water: 96.0 weight %

The components above were added in order to ion exchange water with stirring to be uniformly dispersed therein, to thereby produce the coating composition.

Example 2

Hostaflon TF5050 (available from Dyneon, PTFE dispersion, a solid content of 58 weight %): 1.0 weight %

KRYTOX LW-1200 (available from Du Pont de Numours & Co., PTFE emulsion, a solid content of 20 weight %, and a number average molecular weight of 40,000): 1.0 weight %

K-926 (available from Chukyo Yushi K.K., perfluoropolyether emulsion, a nonvolatile content of 64 weight %): 2.5 weight %

KF-618 (available from Shin-Etsu Chemical Co., Ltd., polyether modified silicone oil polyoxyethylene.methylpolysiloxane copolymer): 0.1 weight % ion exchange water: 93.9 weight %

The components above were added in order to ion exchange water with stirring to be uniformly dispersed therein, to thereby produce the coating composition.

Example 3

Lubron LDW-40 (available from Daikin Industries, Ltd., PTFE dispersion, a solid content of 40 weight %): 1.0 weight %

NET-HC-04 (available from Nikko Chemicals Co., Ltd., perfluoropolyether emulsion, a nonvolatile content of 65 weight %) 3.0 weight %

KF-354 (available from Shin-Etsu Chemical Co., Ltd., polyether modified silicone oil polyoxyethylene.methylpolysiloxane copolymer): 0.1 weight %

Emustar 0001 (available from NIPPON SEIRO CO., LTD., Microcrystalline Wax Emulsion, a solid content of 40 weight %): 1.0 weight %

Hiviswako 104 (available from Wako Pure Chemical Industries, Ltd., Ion cross-linked polyacrylic acid): 0.1 weight %

Triethanol amine (90 weight % of aqueous solution): 0.15 weight % ion exchange water: 94.65 weight %

After Hiviswako 104 was dissolved in ion exchange water, Lubron LDW-40, L-205, KF-354 and Emustar 0001 were added in order with stirring to be uniformly dispersed therein. Thereafter, triethanol amine was added thereto to thicken the composition uniformly, to thereby produce the coating composition.

Example 4

Hostaflon TF5050 (available from Dyneon, PTFE dispersion, a solid content of 58 weight %): 0.7 weight %

K-926 (available from Chukyo Yushi K.K., perfluoropolyether emulsion, a nonvolatile content of 64 weight %): 3.0 weight %

FPD-4668 (available from Shin-Etsu Chemical Co., Ltd., fluorine-polyether modified silicone oil): 0.1 weight %

Selosol D-355 (available from Chukyo Yushi K.K., petroleum resin emulsion, a solid content of 40 weight %): 0.5 weight %

Sodium alginate (available from KIBUN FOOD CHEMIFA CO., LTD.): 0.3 weight %

Calcium Chloride: 0.06 weight % ion exchange water: 95.34 weight %

After sodium alginate was dissolved in ion exchange water, calcium chloride was added and uniformly dispersed therein. Thereafter, Hostaflon TF5050, K-926, FPD-4668, and Selosol D-355 were added with stirring to be uniformly dispersed therein, to thereby produce the coating composition.

Example 5

KRYTOX DF/W (available from Du Pont de Numours & Co., PTFE emulsion, a solid content of 20 weight %, and a number average molecular weight of 3,500): 1.5 weight %

KRYTOX LW-1200 (available from Du Pont de Numours & Co., PTFE emulsion, a solid content of 20 weight %, and a number average molecular weight of 40,000): 1.5 weight %

K-926 (available from Chukyo Yushi K.K., perfluoropolyether emulsion, a nonvolatile content of 64 weight %): 4.0 weight %

FPD-4668 (available from Shin-Etsu Chemical Co., Ltd., fluorine-polyether modified silicone oil): 0.2 weight %

J-642 (available from Chukyo Yushi K.K., polyethylene wax emulsion, a solid content of 35 weight %): 1.0 weight %

Selosol D-355 (available from Chukyo Yushi K.K., petroleum resin emulsion, a solid content of 40 weight %): 0.5 weight %

Hiviswako 104 (available from Wako Pure Chemical Industries, Ltd., Ion cross-linked polyacrylic acid): 0.5 weight %

Morpholine: 1.0 weight % ion exchange water: 89.9 weight %

After Hiviswako 104 was dissolved in ion exchange water, KRYTOX DF/W, KRYTOX LW-1200, L-205, FPD-4668, J-642 and Selosol D-355 were added in order with stirring to be uniformly dispersed therein. Thereafter, morpholine was added thereto to thicken the composition uniformly, to thereby produce the coating composition.

Example 6

KRYTOX DF/W (available from Du Pont de Numours & Co., PTFE emulsion, a solid content of 20 weight %, and a number average molecular weight of 3,500): 1.0 weight %

NET-HC-04 (available from Nikko Chemicals Co., Ltd., perfluoropolyether emulsion, a nonvolatile content of 65 weight %): 2.0 weight %

FPD-4668 (available from Shin-Etsu Chemical Co., Ltd., fluorine-polyether modified silicone oil): 0.1 weight %

Selosol D-355 (available from Chukyo Yushi K.K., petroleum resin emulsion, a solid content of 40 weight %): 0.5 weight %

Hiviswako 104 (available from Wako Pure Chemical Industries, Ltd., Ion cross-linked polyacrylic acid): 0.05 weight %

Ammonia water (28 weight % of aqueous solution): 0.05 weight % ion exchange water: 96.3 weight %

After Hiviswako 104 was dissolved in ion exchange water, ammonia water was added thereto to thicken the composition uniformly. Thereafter, KRYTOX DF/W, NET-HC-04, FPD-4668, and Selosol D-355 were added in order with stirring to be uniformly dispersed therein, to thereby produce the coating composition.

Example 7

Lubron LDW-40 (available from Daikin Industries, Ltd., PTFE dispersion, a solid content of 40 weight %): 1.0 weight %

L-205 (available from Chukyo Yushi K.K., perfluoropolyether emulsion, a nonvolatile content of 64 weight %): 2.0 weight %

KF-354 (available from Shin-Etsu Chemical Co., Ltd., polyether modified silicone oil polyoxyethylene.methylpolysiloxane copolymer): 0.1 weight %

BY22-840 (available from Dow Corning Toray Silicone Co., Ltd., carboxyl modified silicone oil emulsion, a nonvolatile content of 35 weight %): 0.3 weight % ion exchange water: 96.6 weight %

The components above were added in order to ion exchange water with stirring to be uniformly dispersed therein, to thereby produce the coating composition.

Example 8

KRYTOX LW-1200 (available from Du Pont de Numours & Co., PTFE emulsion, a solid content of 20 weight %, and a number average molecular weight of 40,000): 2.0 weight %

NET-HC-04 (available from Nikko Chemicals Co., Ltd., perfluoropolyether emulsion, a nonvolatile content of 65 weight %): 2.0 weight %

KF-354 (available from Shin-Etsu Chemical Co., Ltd., polyether modified silicone oil polyoxyethylene.methylpolysiloxane copolymer): 0.1 weight %

SH7036 (available from Dow Corning Toray Silicone Co., Ltd., dimethyl silicone oil emulsion, a nonvolatile content of 38 weight %): 0.3 weight % ion exchange water: 95.6 weight %

The components above were added in order to ion exchange water with stirring to be uniformly dispersed therein, to thereby produce the coating composition.

Example 9

KRYTOX DF/W (available from Du Pont de Numours & Co., PTFE emulsion, a solid content of 20 weight %, and a number average molecular weight of 3,500): 2.5 weight %

Hostaflon TF5050 (available from Dyneon, PTFE dispersion, a solid content of 58 weight %): 0.4 weight %

K-926 (available from Chukyo Yushi K.K., perfluoropolyether emulsion, a nonvolatile content of 64 weight %): 2.5 weight %

KF-618 (available from Shin-Etsu Chemical Co., Ltd., polyether modified silicone oil polyoxyethylene.methylpolysiloxane copolymer): 0.1 weight %

Kunipia G (available from Kunimine Industries, montmorillonite): 2.0 weight % ion exchange water: 92.51 weight %

After KRYTOX DF/W, Hostaflon TF5050, L-205 and KF-618 were added in order to ion exchange water with stirring to be uniformly dispersed in the water, Kunipia G was gradually added thereto with stirring to thicken the composition uniformly, to thereby produce the coating composition.

Example 10

Hostaflon TF5050 (available from Dyneon, PTFE dispersion, a solid content of 58 weight %): 1.0 weight %

Lubron LDW-40 (available from Daikin Industries, Ltd., PTFE dispersion, a solid content of 40 weight %): 0.5 weight %

L-205 (available from Chukyo Yushi K.K., perfluoropolyether emulsion, a nonvolatile content of 64 weight %): 2.5 weight %

KF-618 (available from Shin-Etsu Chemical Co., Ltd., polyether modified silicone oil polyoxyethylene.methylpolysiloxane copolymer): 0.1 weight %

Kelzan (available from KIBUN FOOD CHEMIFA CO., LTD., xanthan gum): 0.3 weight % ion exchange water: 94.1 weight %

After KRYTOX DF/W, Lubron LDW-40, L-205 and KF-618 were added in order to ion exchange water with stirring to be uniformly dispersed in the water, Kelzan was gradually added thereto with stirring to thicken the composition uniformly, to thereby produce the coating composition.

Example 11

Lubron L-2 (available from Daikin Industries, Ltd., PTFE powder): 5.0 weight %
FOMBLIN Y-04 (available from Ausimont K.K., perfluoropolyether): 20.0 weight %
Surflon S-141 (available from Asahi Glass Co., Ltd., fluorochemical active agent): 2.0 weight %
ion exchange water: 73.0 weight %

After Lubron L-2 and FOMBLIN Y-04 were uniformly mixed so as to be formed into a grease form, Surflon S-141 was added to be uniformly dispersed in the mixture. Sequentially, ion exchange water was gradually added with stirring to be uniformly dispersed therein, to thereby prepare the water dispersion comprising polytetrafluoroethylene and perfluoropolyether.

Sequentially, in the following composition, Hiviswako 104 was dissolved in the ion exchange water and, thereafter, the water dispersion and FPD-4668 were added in order with stirring to be uniformly dispersed therein. Thereafter, monoethanol amine was added therein to thicken the composition uniformly, to thereby produce the coating composition.

Water dispersion: 10.0 weight %
FPD-4668 (available from Shin-Etsu Chemical Co., Ltd., fluorine-polyether modified silicone oil): 0.1 weight %
Hiviswako 104 (available from Wako Pure Chemical Industries, Ltd., Ion cross-linked polyacrylic acid): 0.1 weight %
Monoethanol amine (90 weight % aqueous solution) 0.02 weight %
Ion exchange water: 89.0 weight %

Example 12

KRYTOX DF/W (available from Du Pont de Numours & Co., PTFE emulsion, a solid content of 20 weight %, and a number average molecular weight of 3,500): 7.5 weight %
L-205 (available from Chukyo Yushi K.K., perfluoropolyether emulsion, a nonvolatile content of 64 weight %): 5.0 weight %
KF-618 (available from Shin-Etsu Chemical Co., Ltd., polyether modified silicone oil polyoxyethylene.methylpolysiloxane copolymer): 0.1 weight %
ion exchange water: 87.4 weight %

The components were added in order to ion exchange water with stirring to be uniformly dispersed therein, to thereby produce the coating composition.

Comparative Example 1

AG-Lub (available from Asahi Glass Co., Ltd., PTFE CFC-solve dispersion, a solid content of 7 weight %, a number average molecular weight of 3,500): 10.0 weight %
FOMBLIN Y-04 (available from Ausimont K.K., perfluoropolyether): 1.5 weight %
naphtha for industrial use: 89.0 weight %

AG-Lub and FOMBLIN Y-04 were added in order to naphtha for industrial use with stirring to be uniformly dispersed therein, to thereby produce the coating composition.

Comparative Example 2

Lubron L-5 (available from Daikin Industries, Ltd., PTFE powder): 0.5 weight %
FOMBLIN Y-04 (available from Ausimont K.K., perfluoropolyether): 2.0 weight %
PF-5080 (available from Sumitomo 3M Ltd., fluorochemical solvent): 97.0 weight %

Lubron L-5 and FOMBLIN Y-04 were uniformly mixed to be formed into a grease form, PF-5080 was added to be uniformly dispersed in the mixture, to thereby produce the coating composition.

Evaluation (Wax Treatment Test)

With the coating compositions of Examples 1–12 and Comparative Examples 1–2 as the samples, the wax treatments were given to a white paintwork in a hood portion of a car body of Corolla, model year of 1998, produced by Toyota Motor Corporation, in accordance with the following procedures, to make the evaluation on (1) workability in rubbing and uniformity in coating (presence or absence of unevenness), (2) water-repellent property immediately after treatment, (3) persistence of water-repellent property and (4) antifouling property of coating. The results are shown in TABLE 1.

1) Fouling on the paintwork in the hood portion of the car body was removed by use of a commercially available cleaner wax and, further, the wax coating still remaining on the paintwork was removed completely by use of aliphatic solvent.

2) The paintwork in the hood portion of the car was divided into 15 sections. 3.0 g of sample per section (about 30 cm×35 cm) was taken in a cotton towel, and the paintwork was rubbed with the towel until the paintwork was cleaned up. The same treatments as this were given to the fourteen sections of the paintwork by using the samples of Examples 1–12 and Comparative Examples 1–2. The remaining one section was kept blank.

TABLE 1

| | Examples | | | | | | | | | | | | Comparative Examples | |
|---|---|---|---|---|---|---|---|---|---|---|---|---|---|---|
| | 1 | 2 | 3 | 4 | 5 | 6 | 7 | 8 | 9 | 10 | 11 | 12 | 1 | 2 |
| Workability in rubbing and uniformity in coating | Δ | ⊚ | ⊚ | ⊚ | ⊚ | ⊚ | ○ | Δ | ○ | ○ | Δ | Δ | X | X |
| Water-repellent immediately after treatment | ⊚ | ⊚ | ⊚ | ⊚ | ⊚ | ⊚ | ○ | ○ | Δ | Δ | ⊚ | ⊚ | X | X |
| Persistence of water-repellent | ○ | ○ | ⊚ | ⊚ | ⊚ | ⊚ | ○ | Δ | Δ | ○ | ○ | ○ | X | X |

TABLE 1-continued

| | Examples | | | | | | | | | | | | Comparative Examples | |
|---|---|---|---|---|---|---|---|---|---|---|---|---|---|---|
| | 1 | 2 | 3 | 4 | 5 | 6 | 7 | 8 | 9 | 10 | 11 | 12 | 1 | 2 |
| Antifouling property of coating | ○ | ○ | ◎ | ◎ | ◎ | ◎ | ○ | ○ | ○ | ○ | ○ | ○ | X | X |

1) Workability in rubbing and uniformity in coating
Visual inspection on presence or absence of unevenness
◎: Excellent   ○: Good   Δ: Moderate   X: Bad
2) Water-repellent property immediately after treatment
Visual inspection of balls of water on the coated paintwork
◎: Repels water considerably with rounded balls of water
○: Repels water substantially but deforms balls of water
Δ: Repels water moderately
X: Hardly repels water
3) Persistence of water-repellent
After exposure to the outdoors for one month after treatment, the paintwork was washed with a car washing sponge, and the visual inspection was made of balls of water on the coated paintwork
◎: Repels water considerably with rounded balls of water
○: Repels water substantially but deforms balls of water
Δ: Repels water moderately
X: Hardly repels water
4) Antifouling property of coating
After exposure to the outdoors for one month after treatment, the paintwork was washed with a car washing sponge, and the visual inspection was made of fouling of the coating
◎: No fouling   ○: Almost no fouling   Δ: Fouling to some extent   X: Fouling Production Example 1

Preparation of Coating Composition A

KRYTOX DF/W (available from Du Pont de Numours & Co., PTFE emulsion, a solid content of 20 weight %, and a number average molecular weight of 3,500): 2.0 weight %
L-205 (available from Chukyo Yushi K.K., Ltd., perfluoropolyether emulsion, a nonvolatile content of 64 weight %): 2.0 weight %
ion exchange water: 96.0 weight %

The components above were added in order to ion exchange water with stirring to be uniformly dispersed, to thereby prepare the coating composition A.

Production Example 2

Preparation of Coating Composition B

KRYTOX DF/W (available from Du Pont de Numours & Co., PTFE emulsion, a solid content of 20 weight %, and a number average molecular weight of 3,500): 2.5 weight %
KRYTOX LW-1200 (available from Du Pont de Numours & Co., PTFE emulsion, a solid content of 20 weight %, and a number average molecular weight of 40,000): 1.0 weight %
L-205 (available from Chukyo Yushi K.K., perfluoropolyether emulsion, a nonvolatile content of 64 weight %): 2.5 weight %
KF-618 (available from Shin-Etsu Chemical Co., Ltd., polyether modified silicone oil polyoxyethylene.methylpolysiloxane copolymer): 0.1 weight %
ion exchange water: 93.9 weight %

The components above were added in order to ion exchange water with stirring to be uniformly dispersed therein, to thereby prepare the coating composition B.

Production Example 3

Preparation of Coating Composition C

Lubron LDW-40 (available from Daikin Industries, Ltd., PTFE dispersion, a solid content of 40 weight %): 1.5 weight %
K-926 (available from Chukyo Yushi K.K., perfluoropolyether emulsion, a nonvolatile content of 64 weight %): 3.0 weight %
KF-354 (available from Shin-Etsu Chemical Co., Ltd., polyether modified silicone oil polyoxyethylene.methylpolysiloxane copolymer): 0.1 weight %
Emustar 0001 (available from NIPPON SEIRO CO., LTD., Microcrystalline Wax Emulsion, a solid content of 40 weight %): 1.0 weight %
Hiviswako 104 (available from Wako Pure Chemical Industries, Ltd., Ion cross-linked polyacrylic acid): 0.1 weight %
Triethanol amine (90 weight % of aqueous solution): 0.15 weight %
ion exchange water: 94.15 weight %

After Hiviswako 104 was dissolved in ion exchange water, Lubron LDW-40, K-926, KF-354 and Emustar 0001 were added in order thereto with stirring to be uniformly dispersed in the water. Thereafter, triethanol amine was added thereto to thicken the composition uniformly, to thereby prepare the coating composition C.

Production Example 4

Preparation of Coating Composition D

KRYTOX LW-1200 (available from Du Pont de Numours & Co., PTFE emulsion, a solid content of 20 weight %, and a number average molecular weight of 40,000): 3.0 weight %

K-926 (available from Chukyo Yushi K.K., perfluoropolyether emulsion, a nonvolatile content of 64 weight %): 3.0 weight %
FPD-4668 (available from Shin-Etsu Chemical Co., Ltd., fluorine-polyether modified silicone oil): 0.1 weight %
Selosol D-355 (available from Chukyo Yushi K.K., petroleum resin emulsion, a solid content of 40 weight %): 0.5 weight %
Sodium alginate (available from KIBUN FOOD CHEMIFA CO., LTD.): 0.3 weight %
Calcium Chloride: 0.06 weight %
Ion exchange water: 93.04 weight %

After sodium alginate was dissolved in ion exchange water, calcium chloride was added to uniformly thicken the composition. Thereafter, KRYTOX LW-1200, K-926, FPD-4668, and Selosol D-355 were added with stirring to be uniformly dispersed therein, to thereby prepare the coating composition D.

Production Example 5

Preparation of Coating Composition E

Hostaflon TF5050 (available from Dyneon, PTFE dispersion, a solid content of 58 weight %): 1.5 weight %
L-205 (available from Chukyo Yushi K.K., perfluoropolyether emulsion, a nonvolatile content of 64 weight %): 4.0 weight %
KF-618 (available from Shin-Etsu Chemical Co., Ltd., polyether modified silicone oil polyoxyethylene.methylpolysiloxane copolymer): 0.1 weight %
Surflon S-141 (available from Asahi Glass Co., Ltd., fluorochemical active agent): 0.1 weight %
Hiviswako 104 (available from Wako Pure Chemical Industries, Ltd., Ion cross-linked polyacrylic acid): 0.05 weight %
Ammonia water (28 weight % of aqueous solution): 0.05 weight %
Ion exchange water: 94.2 weight %

After Hiviswako 104 was dissolved in ion exchange water, Hostaflon TF5050, L-205, KF-618, and Surflon S-141 were added in order with stirring to be uniformly dispersed therein. Thereafter, ammonia water was added thereto to thicken the composition uniformly, to thereby prepare the coating composition E.

Production Example 6

Preparation of Coating Composition F

Lubron LDW-40 (available from Daikin Industries, Ltd., PTFE dispersion, a solid content of 40 weight %): 1.0 weight %
L-205 (available from Chukyo Yushi K.K., perfluoropolyether emulsion, a nonvolatile content of 64 weight %): 2.0 weight %
FPD-4668 (available from Shin-Etsu Chemical Co., Ltd., fluorine-polyether modified silicone oil): 0.1 weight %
Fluoromontanate emulsion (available from Clariant (Japan) K.K., fluorochemical wax emulsion, a solid content of 21.2 weight %): 1.0 weight %
Hiviswako 104 (available from Wako Pure Chemical Industries, Ltd., Ion cross-linked polyacrylic acid): 0.05 weight %
Ammonia water (28 weight % of aqueous solution): 0.05 weight %
ion exchange water: 95.8 weight %

After Hiviswako 104 was dissolved in ion exchange water, Lubron LDW-40, L-205, FPD-4668 and Fluoromontanate emulsion were added in order with stirring to be uniformed dispersed therein. Thereafter, ammonia water was added thereto to thicken the composition uniformly, to thereby prepare the coating composition F.

Production Example 7

Preparation of Coating Composition G

KRYTOX DF/W (available from Du Pont de Numours & Co., PTFE emulsion, a solid content of 20 weight %, and a number average molecular weight of 3,500): 1.5 weight %
KRYTOX LW-1200 (available from Du Pont de Numours & Co., PTFE emulsion, a solid content of 20 weight %, and a number average molecular weight of 40,000): 1.5 weight %
L-205 (available from Chukyo Yushi K.K., perfluoropolyether emulsion, a nonvolatile content of 64 weight %): 4.0 weight %
FPD-4668 (available from Shin-Etsu Chemical Co., Ltd., fluorine-polyether modified silicone oil): 0.1 weight %
Lumiflon FE-3000 (available from Asahi Glass Co., Ltd., fluorocarbon resin emulsion, a nonvolatile content of 50 weight %): 0.1 weight %
Sodium alginate (available from KIBUN FOOD CHEMIFA CO., LTD.): 0.3 weight %
Calcium Chloride: 0.06 weight %
ion exchange water: 92.54 weight %

After sodium alginate was dissolved in ion exchange water, calcium chloride was added therein to uniformly thicken the composition. Thereafter, KRYTOX DF/W, KRYTOX LW-1200, L-205, FPD-4668 and Limiflon FE-3000 were added in order with stirring to be uniformly dispersed therein, to thereby prepare the coating composition G.

Production Example 8

Preparation of Coating Composition H

K-926 (available from Chukyo Yushi K.K., perfluoropolyether emulsion, a nonvolatile content of 64 weight %): 3.0 weight %
Emustar 0001 (available from NIPPON SEIRO CO., LTD., Microcrystalline Wax Emulsion, a solid content of 40 weight %): 1.0 weight %
KF-354 (available from Shin-Etsu Chemical Co., Ltd., polyether modified silicone oil polyoxyethylene.methylpolysiloxane copolymer): 0.1 weight %
Ion exchange water: 95.9 weight %

The components above were added in order to ion exchange water with stirring to be uniformly dispersed therein, to thereby prepare the coating composition H.

Production Example 9

Preparation of Coating Composition I

Lubron LDW-40 (available from Daikin Industries, Ltd., PTFE dispersion, a solid content of 40 weight %): 1.5 weight %

FPD-4668 (available from Shin-Etsu Chemical Co., Ltd., fluorine-polyether modified silicone oil): 0.1 weight %

Hiviswako 104 (available from Wako Pure Chemical Industries, Ltd., Ion cross-linked polyacrylic acid): 0.05 weight %

Ammonia water (28 weight % of aqueous solution): 0.05 weight %

Ion exchange water: 98.3 weight %

After Hiviswako 104 was dissolved in ion exchange water, Lubron LDW-40 and FPD-4668 were added in order with stirring to be uniformly dispersed therein. Thereafter, ammonia water was added therein, to thicken the composition uniformly, to thereby prepare the coating composition I.

Production Example 10

Preparation of Coating Composition J

Fluoromontanate emulsion (available from Clariant (Japan) K.K., fluorochemical wax emulsion, a solid content of 21.2 weight %): 5.0 weight %

FPD-4668 (available from Shin-Etsu Chemical Co., Ltd., fluorine-polyether modified silicone oil): 0.1 weight %

Ion exchange water: 94.9 weight %

The compositions were added in order to ion exchange water with stirring to be uniformly dispersed therein, to thereby prepare the coating composition J.

Production Example 11

Preparation of Coating Composition K

KRYTOX LW-1200 (available from Du Pont de Numours & Co., PTFE emulsion, a solid content of 20 weight %, and a number average molecular weight of 40,000): 3.0 weight %

Lumiflon FE-3000 (available from Asahi Glass Co., Ltd., fluorocarbon resin emulsion, a nonvolatile content of 50 weight %): 0.1 weight %

Hiviswako 104 (available from Wako Pure Chemical Industries, Ltd., Ion cross-linked polyacrylic acid): 0.05 weight %

Ammonia water (28 weight % of aqueous solution): 0.05 weight %

Ion exchange water: 96.8 weight %

After Hiviswako 104 was dissolved in ion exchange water, KRYTOX LW-1200 and Lumiflon FE-3000 were added in order with stirring to be uniformly dispersed therein. Thereafter, ammonia water was added therein, to thicken the composition uniformly, to thereby prepare the coating composition K.

Production Example 12

Preparation of Coating Composition L

Emustar 0001 (available from NIPPON SEIRO CO., LTD., Microcrystalline Wax Emulsion, a solid content of 40 weight %): 2.5 weight %

BY-22-007 (available from Dow Corning Toray Silicone Co., Ltd., dimethyl silicone oil emulsion, a nonvolatile content of 50 weight %): 2.0 weight %

Ion exchange water: 95.5 weight %

The components were added in order to ion exchange water with stirring to be uniformly dispersed therein, to thereby prepare the coating composition L.

Examples 13–33 and Comparative Examples 3–21

The coating compositions A-L thus obtained were impregnated in the non-woven fabrics A-G, each being cut to 30×40 cm, in such a proportion that the coating compositions are 2.5 times the non-woven fabrics in weight in the combinations shown in TABLE 1, to thereby prepare the coating cloths of Examples 13–33 and Comparative Examples 3–21.

Non-woven fabric A: 100% polyester non-woven fabric (basis weight of 70 $g/m^2$ and density of 0.07 $g/cm^3$ under load condition of 1.961 KPa);

Non-woven fabric B: 30% nylon, 30% polyester and 40% rayon blended, non-woven fabric (basis weight of 70 $g/m^2$ and density of 0.16 $g/cm^3$ under load condition of 1.961 KPa);

Non-woven fabric C: 100% rayon non-woven fabric (basis weight of 120 $g/m^2$ and density of 0.18 $g/cm^3$ under load condition of 1.961 KPa);

Non-woven fabric D: 50% rayon and 50% polyester blended, non-woven fabric (basis weight of 16 $g/m^2$ and density of 0.14 $g/cm^3$ under load condition of 1.961 KPa);

Non-woven fabric E: 50% nylon and 50% polyester blended, non-woven fabric (basis weight of 350 $g/m^2$ and density of 0.23 $g/cm^3$ under load condition of 1.961 KPa);

Non-woven fabric F: 50% polyethylene and 50% polyester blended, non-woven fabric (basis weight of 100 $g/m^2$ and density of 0.01 $g/cm^3$ under load condition of 1.961 KPa); and Non-woven fabric G: 100% nylon non-woven fabric (basis weight of 130 $g/m^2$ and density of 0.33 $g/cm^3$ under load condition of 1.961 KPa)

Evaluation (Wax Treatment Test)

The wax treatments were given to a white paintwork in a hood portion of a car body of each of two Corollas, model year of 1998, produced by Toyota Motor Corporation by rubbing the paintwork with the coating cloths of Examples 13–33 and Comparative Examples 3–21 in accordance with the following procedures, and the evaluation was made on (1) workability in rubbing and uniformity in coating (presence or absence of unevenness), (2) water-repellent property immediately after treatment, (3) persistence of water-repellent property and (4) antifouling property of coating. The results are shown in TABLE 2.

1) Fouling on the paintwork in the hood portion of the car body was removed by use of a commercially available cleaner wax and, further, the wax coating still remaining on the paintwork was removed completely by use of aliphatic solvent.

2) The paintwork in the hood portion of the car body was divided into a required number of sections, and the paintwork in each section (about 30 cm×35 cm) was rubbed with the coating cloth until the paintwork was cleaned up. The same rubbing as this was made by using the samples of the coating cloths of Examples 13–33 and Comparative Examples 3–21.

TABLE 2

|  | Examples | | | | | | | | | | | | | | | | | | | | |
|---|---|---|---|---|---|---|---|---|---|---|---|---|---|---|---|---|---|---|---|---|---|
|  | 13 | 14 | 15 | 16 | 17 | 18 | 19 | 20 | 21 | 22 | 23 | 24 | 25 | 26 | 27 | 28 | 29 | 30 | 31 | 32 | 33 |
| Coating Components | A | A | A | B | B | B | C | C | C | D | D | D | E | E | E | F | F | F | G | G | G |
| Non-woven fabric | A | B | C | A | B | C | A | B | C | A | B | C | A | B | C | A | B | C | A | B | C |
| (1) Workability in rubbing and uniformity in coating | Δ | ○ | ○ | ○ | ⊚ | ○ | ○ | ⊚ | ○ | ○ | ⊚ | ○ | ○ | ⊚ | ○ | ○ | ⊚ | ○ | ○ | ⊚ | ○ |
| (2) Water-repellent immediately after treatment | Δ | ○ | ○ | Δ | ⊚ | ○ | ○ | ⊚ | ○ | ○ | ⊚ | ○ | ○ | ○ | ○ | ○ | ⊚ | ⊚ | ⊚ | ⊚ | ⊚ |
| (3) Persistence of water-repellent | Δ | Δ | Δ | Δ | ○ | Δ | ○ | ⊚ | ○ | ○ | ⊚ | ○ | ○ | ⊚ | ○ | ○ | ⊚ | ○ | ○ | ⊚ | ○ |
| (4) Antifouling property of coating | Δ | ○ | Δ | Δ | ○ | Δ | ○ | ⊚ | ○ | ○ | ⊚ | ○ | ○ | ⊚ | ○ | ○ | ⊚ | ○ | ○ | ⊚ | ○ |

|  | Compara Ex. | | | | | | | | | | | | | | | | | | |
|---|---|---|---|---|---|---|---|---|---|---|---|---|---|---|---|---|---|---|---|
|  | 3 | 4 | 5 | 6 | 7 | 8 | 9 | 10 | 11 | 12 | 13 | 14 | 15 | 16 | 17 | 18 | 19 | 20 | 21 |
| Coating Components | H | H | H | I | I | I | J | J | J | K | K | K | L | L | L | B | B | B | B |
| Non-woven fabric | A | B | C | A | B | C | A | B | C | A | B | C | A | B | C | D | E | F | G |
| (1) Workability in rubbing and uniformity in coating | X | Δ | X | X | X | X | X | Δ | X | X | X | X | X | Δ | X | Δ | X | X | X |
| (2) Water-repellent immediately after treatment | X | Δ | X | X | X | X | X | Δ | X | X | Δ | X | Δ | Δ | Δ | Δ | Δ | X | X |
| (3) Persistence of water-repellent | X | X | X | X | X | X | X | X | X | X | Δ | X | X | X | X | X | Δ | X | X |
| (4) Antifouling property of coating | X | X | X | X | X | X | X | X | X | X | Δ | X | X | X | X | X | Δ | X | X |

1) Workability in rubbing and uniformity in coating
Visual inspection on presence or absence of unevenness
⊚: Excellent   ○: Good   Δ: Moderate   X: Bad
2) Water repellent property immediately after treatment
Visual inspection of balls of water on the coated paintwork
⊚: Repels water considerably with rounded balls of water
○: Repels water substantially but deforms balls of water
Δ: Repels water moderately
X: Hardly repels water
3) Persistence of water-repellent
After exposure to the outdoors for one month after treatment, the paintwork was washed with a car washing sponge, and the visual inspection was made of balls of water on the coated paintwork
⊚: Repels water considerably with rounded balls of water
○: Repels water substantially but deforms balls of water
Δ: Repels water moderately
X: Hardly repels water
4) Antifouling property of coating
After exposure to the outdoors for one month after treatment, the paintwork was washed with a car washing sponge, and the visual inspection was made of fouling of the coating
⊚: No fouling   ○: Almost no fouling   Δ: Fouling to some extent   X: Fouling While the illustrative examples of the present invention are provided in the above description, such is for illustrative purpose only and it is not to be construed restrictively. Modification and variation of the present invention that will be obvious to those skilled in the art is to be covered in the following claims.

What is claimed is:

1. A coating cloth wherein a coating composition comprising polytetrafluoroethylene and perfluoropolyether is impregnated in a cloth having a basis weight of 30–300 g/m$^2$ and a density of 0.02–0.3 g/cm$^3$ under load conditions of 1.961 KPa;

wherein the coating composition is water dispersion comprising polytetrafluoroethylene and perfluoropolyether;

wherein the content of polytetrafluoroethylene in the coating composition is not more than 0.8 weight %; and wherein at least one ion cross-linked organic acid is further mixed in the coating composition as a thickening agent.

* * * * *